(12) United States Patent
Pfennig et al.

(10) Patent No.: US 6,216,982 B1
(45) Date of Patent: Apr. 17, 2001

(54) SUCTION DEVICE FOR BOUNDARY LAYER CONTROL IN AN AIRCRAFT

(75) Inventors: Juergen Pfennig, Marfeld; Juergen Meister, Buxtehude, both of (DE)

(73) Assignee: DaimlerChrysler Aerospace Airbus GmbH, Hamburg (DE)

(*) Notice: Subject to any disclaimer, the term of this patent is extended or adjusted under 35 U.S.C. 154(b) by 0 days.

(21) Appl. No.: 09/305,527

(22) Filed: May 5, 1999

(30) Foreign Application Priority Data

May 6, 1998 (DE) .............................................. 198 20 097

(51) Int. Cl.$^7$ .................................................... B64C 21/06
(52) U.S. Cl. ........................... 244/130; 244/208; 244/209
(58) Field of Search .................................... 244/209, 208, 244/130

(56) References Cited

U.S. PATENT DOCUMENTS

| | | | | |
|---|---|---|---|---|
| 2,659,552 | * | 11/1953 | Stalker | 244/209 |
| 3,149,804 | * | 9/1964 | Litz, Jr. | 244/209 |
| 3,317,162 | * | 5/1967 | Grant | 244/209 |
| 3,801,048 | * | 4/1974 | Riccius | 244/209 |
| 5,141,182 | * | 8/1992 | Coffinberry | 244/209 |
| 5,297,765 | * | 3/1994 | Hughes et al. | 244/209 |
| 5,417,391 | * | 5/1995 | Savitsky et al. | 244/209 |
| 5,884,873 | | 3/1999 | Breit | 244/209 |

FOREIGN PATENT DOCUMENTS

| | | |
|---|---|---|
| 1280057 | 10/1968 | (DE) . |
| 19634296 | 4/1997 | (DE) . |
| 19720069 | 10/1997 | (DE) . |
| 19617952 | 11/1997 | (DE) . |

* cited by examiner

Primary Examiner—J. Woodrow Eldred
(74) Attorney, Agent, or Firm—W. F. Fasse; W. G. Fasse

(57) ABSTRACT

A system for achieving a boundary layer control by sucking at least a portion of the boundary layer air flow through perforated or porous suction areas on the outer skin of the wings or other areas of the aircraft, includes one or more jet pumps (7) arranged in the bypass engine (5) of the aircraft, and a system of suction conduits (4) connecting the jet pumps (7) to suction channels (3A) communicating with the perforated or porous suction areas (3). Each jet pump (7) includes an ejector pipe (101) that is driven by an external surrounding driving jet (8) or by an internal driving jet (8) flowing through an internal jet pipe (15). The jet pumps (7) are arranged at selected locations in the air intake upstream of the fan, in the bypass channel (18) just downstream of the fan, in the bypass channel near the outlet end thereof, in the core hot gas channel (19) upstream of a compressor assembly, and/or in the core channel downstream of a turbine assembly. The jet pumps (7) provide an efficient, maintenance-free, reliable, and easily installable suction generator system.

21 Claims, 3 Drawing Sheets

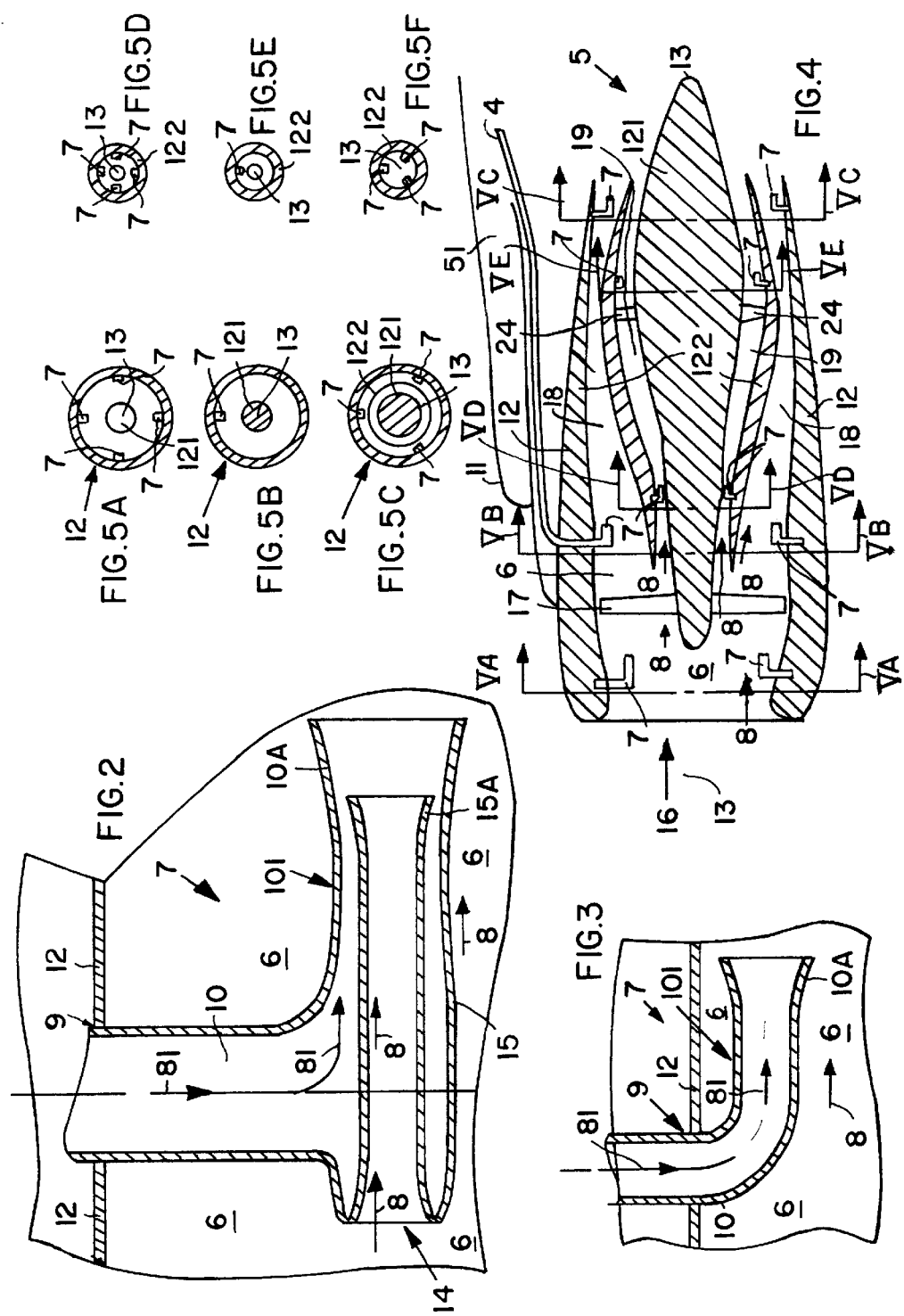

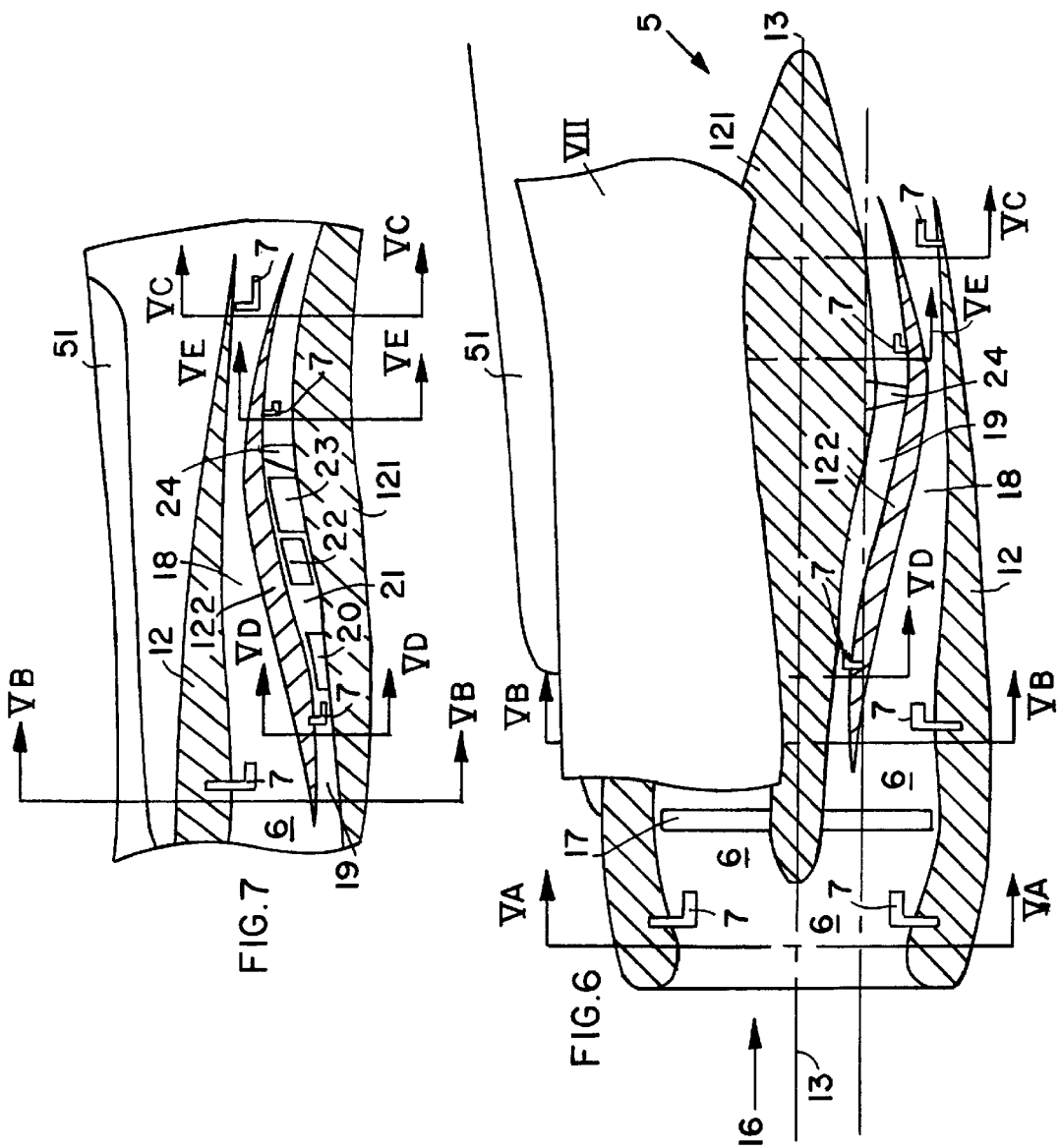

SUCTION DEVICE FOR BOUNDARY LAYER CONTROL IN AN AIRCRAFT

PRIORITY CLAIM

This application is based on and claims the priority under 35 U.S.C. §119 of German Patent Application 198 20 097.8, filed on May 6, 1998, the entire disclosure of which is incorporated herein by reference.

FIELD OF THE INVENTION

The invention relates to a system for generating a suction air flow for sucking off at least a portion of the boundary layer air flow at least at the flow critical areas on the outer skin of an aircraft, and thereby controlling the boundary layer and particularly a shock boundary layer so as to maintain a laminar boundary layer flow.

BACKGROUND INFORMATION

It is generally known that it is possible to reduce aerodynamic friction resistance and overall drag on the skin of an aircraft, by sucking away at least a portion of the air forming the boundary layer along the aerodynamic surfaces of the outer skin of the aircraft, especially at flow critical areas. Various embodiments and configurations of systems for achieving such boundary layer control by suction are known in the art. For example, German Patent Laying-Out Publication DE-AS 1 280 057 discloses a system for sucking boundary layer air away from an aircraft wing, wherein a suction source located in the interior of the aircraft is connected to the suction passages in the wings by a duct system including suction lines such as pipes or hoses. Details regarding the structure and functioning of the suction source arranged in the interior of the aircraft are not disclosed.

German Patent Laying-Open Publication 197 20 069 and German Patent Laying-Open Publication 196 34 296 each disclose a system for reducing noise emissions and achieving a boundary layer control in connection with a bypass jet engine. One or more hollow air chambers are provided in the nacelle or housing wall of the engine. The outside of the housing wall is provided with corrugations or fluted channels for directing the boundary layer air flow along the housing, and respective openings passing through the housing wall into the hollow chamber from the fluted channels. Further openings pass through the inner wall to connect the hollow chamber or chambers with the bypass channel of the engine.

With such a known structure, at least a portion of the boundary layer air flowing along the outer surface of the engine housing is sucked through the hollow chambers and into the engine bypass channel, as a result of a suction effect created by the supersonic bypass flow being blown through the bypass channel by the fan of the engine. The suction air being sucked through the hollow chambers and into the bypass channel forms a subsonic flow that surrounds the higher velocity active bypass flow and is emitted out of the tail end of the engine together therewith. Thereby, the subsonic flow surrounding or enclosing the supersonic bypass flow is intended to reduce the noise emissions. By also providing a suction flow into the bypass channel upstream of the fan, the flow velocity along the tips of the fan blades is reduced, whereby the forward noise emissions from the fan are intended to be reduced. Both references generally mention that the arrangement of forward-aft extending fluted channels on the outer surface of the engine housing with suction holes therein could also be provided on other surfaces of the aircraft, such as the fuselage and the wings, and that these other surfaces could be pneumatically connected to the suction effect provided by the engine fan in order to achieve a boundary layer control on these surfaces.

German Patent Laying-Open Publication 196 17 952 and corresponding U.S. Pat. No. 5,884,873 (Breit) issued Mar. 23, 1999, disclose a suction generator system including at least one ejector or jet pump for generating a suction flow that is used to suck at least a portion of the boundary layer air through suction holes provided in the aircraft skin. The ejector or jet pump is operated by any selected one or more of several airflow sources, including the pressure differential between the pressurized passenger cabin and the ambient exterior environment, and a flow of high pressure tap or bleed air from at least one engine.

The prior art has not been able to provide an economical and easily adaptable system using one or more suction sources to achieve suction and control of the boundary layer air flow over relatively large surface areas of an aircraft, using the high mass flow of air being moved by an air breathing engine, such as the bypass flow of a high bypass ratio fanjet or turbofan engine, as the primary driving force for the suction generation. Particularly, the prior art solutions have not been shown to achieve an adequate suction flow to provide the required boundary layer control over large surface areas of the aircraft using only the bypass flow of an engine as the driving force for the suction generation. The prior art systems also generally require specialized construction of the aircraft engine or engines, and are not easily retro-fittable in existing aircraft.

SUMMARY OF THE INVENTION

In view of the above, it is the aim of the invention to provide a system for achieving boundary layer control by means of suction in an aircraft, which economically uses the pre-existing energy resources of an air breathing engine, and particularly a modern bypass fanjet or turbofan engine, while providing a sufficient suction air flow to achieve a complete boundary layer control including a shock boundary layer control for large suction areas of the aircraft skin. It is a further object of the invention to provide such a system that is nearly free of maintenance requirements and also reliable and robust against failure, while being adaptable to many different configurations of aircraft, and retro-fittable in existing aircraft engines. The invention also aims to avoid or overcome the additional disadvantages of the prior art, and to achieve further advantages, as apparent from the present specification.

The above objects have been achieved in a boundary layer suction system according to the invention, provided in an aircraft including an aircraft body and an air breathing engine connected to the aircraft body, wherein the aircraft body includes a fuselage and wings for example, and an outer skin of the aircraft body includes suction areas at least at the flow critical areas thereof. The system provides suction at the suction areas to suck away at least a portion of the boundary layer air flow, in order to maintain a proper laminar flow at these critical areas. The system includes at least one jet pump or ejector pump arranged in the open flow cross-section of the engine and a suction conduit that connects the jet pump to at least one of the suction areas of the outer skin of the aircraft. The suction areas are provided with hollow suction passages therein, as well as holes or a porous surface through which the boundary layer air may be sucked away. A driving jet of air being propelled through the engine drives the jet pump in order to generate the required suction.

According to particular embodiments of the invention, the jet pump may include either a simple bent or curved suction pipe terminating in an open, flared outlet mouth or bell facing downstream in the driving jet air flow. Alternatively, the jet pump may include an internal channel or driving jet pipe that conveys the driving jet internally through the jet pump so that it generates the driving suction inside the flared outlet mouth or bell of the suction pipe. The jet pumps are arranged at one or more locations within the engine, namely in the engine intake upstream of the fan, in the bypass channel just downstream of the fan, in the core channel of the engine upstream and/or downstream of the compressor assembly, combustion chamber and turbine assembly, and/or in the bypass channel at a point at which the hot core gases combine with the bypass flow at the tailcone of the engine transitioning to the thrust nozzle.

The inventive system achieves an economical boundary layer suction and control, and/or similarly a shock boundary layer control in an aircraft, by using the pre-existing energy resources of the air breathing engine, which are conventionally not otherwise available. By arranging a number of the jet pumps at suitable locations within the engine according to the invention, it is easy to provide the proper volume flow and degree of suction vacuum required for achieving a boundary layer suction and control over suction areas having a relatively large total surface area, without requiring substantial increases in fuel consumption of the engine or other additional energy inputs. Moreover, the inventive system avoids additional moving parts, and is therefore nearly maintenance free and reliable against failure.

BRIEF DESCRIPTION OF THE DRAWINGS

In order that the invention may be clearly understood, it will now be described in connection with example embodiments, with reference to the accompanying drawings, wherein:

FIG. 2 is a cut-away section inside the engine showing a first embodiment of a jet pump used as a suction generator connected to the suction conduit;

FIG. 3 is a cut-away section generally corresponding to that of FIG. 2, but showing another, simpler embodiment of a jet pump used as a Auction generator in the engine;

FIG. 4 is a schematic lengthwise section through the bypass engine indicating several possible locations at which the jet pumps may be arranged according to the invention;

FIG. 5A is a schematic cross-section through the bypass engine along the section line VA—VA of FIG. 4, showing an exemplary arrangement of four jet pumps that are uniformly circumferentially spaced from each other in the air intake passage of the engine;

FIG. 5B is a schematic cross-section along the section line VB—VB of FIG. 4, showing an alternative exemplary arrangement of only one jet pump at the top of the engine in the bypass channel;

FIG. 5C is a schematic cross-section along the section line VC—VC of FIG. 4, showing a further exemplary arrangement of three jet pumps that are uniformly circumferentially spaced from each other in the bypass channel of the engine;

FIG. 5D is a schematic cross-section along the section line VD—VD of FIG. 4, showing an exemplary arrangement of four jet pumps that are uniformly circumferentially spaced from each other in the core hot g as channel;

FIG. 5E is a schematic cross-section taken along the section line VE—VE of FIG. 4, showing an exemplary arrangement of one jet pump arranged near the top or 12 o'clock position of the engine in the core hot gas channel;

FIG. 5F is another schematic cross-section showing an exemplary arrangement of three jet pumps uniformly circumferentially spaced from each other in the core hot gas channel;

FIG. 6 is an enlarged partially cut-away sectioned view corresponding to FIG. 4; and FIG. 7 is a schematic sectional detail view of a detail portion VII of FIG. 6.

Figure 1:
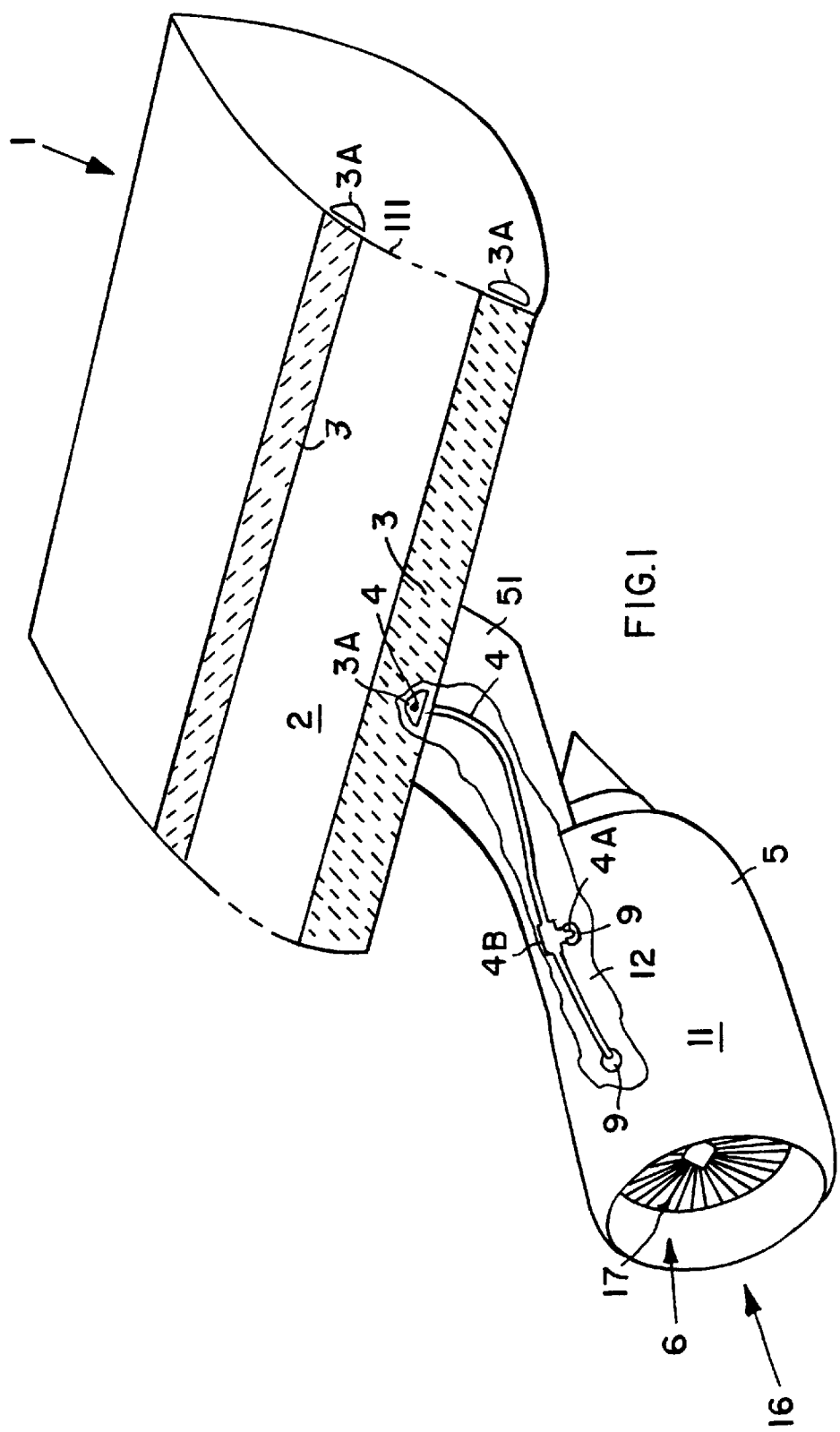
FIG. 1 is a schematic perspective view of a bypass engine mounted on a wing of an aircraft, partially broken open to show a suction conduit leading from the engine to at least one suction area on the outer skin surface of the wing.

DETAILED DESCRIPTION OF PREFERRED EXAMPLE EMBODIMENTS AND OF THE BEST MODE OF THE INVENTION

As shown in FIG. 1, an aircraft, generally indicated by reference number 1, includes a wing 111 with an outer skin 2. At least certain flow critical areas of the outer skin 2 are embodied as suction areas 3, such as an area along the leading edge and an area prone to flow separation and shock formation extending spanwise along a top low pressure area of the wing at a spacing aft of the leading edge. Additional suction areas can be provided on other areas of the outer skin of the aircraft, for example at areas of the fuselage and/or stabilizers at which a boundary layer control is needed.

The suction areas 3 are formed with a porous skin material, or a skin having a great number of perforations or holes therethrough, in communication with suction channels 3A underneath the skin. Thereby, application of a suction vacuum to the suction channels 3A will suck air, and particularly a portion of the air forming a boundary layer over the outer skin 2 of the wing 1, through the porous or perforated skin of the suction areas 3 and into the suction channels 3A. The particular construction and configuration of the porous or perforated skin of the suction areas 3 and the air channels 3A in communication therewith are not limited by or essential to the present invention, but rather may be in accordance with any known arrangements for achieving a boundary layer control by sucking away at least a portion of the boundary layer air flow.

As further shown in FIG. 1, the aircraft 1 also includes an air breathing engine 5, and particularly a bypass fanjet or turbofan engine 5 in the presently described example embodiments. The engine 5 is mounted on a pylon 51 and thereby connected to the structure of the wing 111. According to the invention, the bypass engine 5 is used as the power source for generating the suction vacuum necessary for achieving the boundary layer suction through the perforated or porous suction areas 3. To achieve this, at least one suction conduit 4 leads from the bypass engine 5 through the pylon 51 and is pneumatically connected to the suction channels 3A of the suction areas 3.

The arrangement of the suction conduit 4 is merely schematically shown in the broken open portion of FIG. 1, whereby it should be understood that the suction conduit 4 is arranged within the confines of the aircraft outer skin structure in order to avoid aerodynamic drag. For example, the suction conduit 4 can be arranged to run along a space between an inner wall 12 and an outer wall 11 making up the housing or nacelle of the engine 5, as can be seen in connection with FIGS. 2, 3 and 4 as discussed below. The suction conduit 4 may be any pipe, hose, duct, passage, or channel that is suitable for communicating a suction vacuum from the engine 5 through the pylon 51 and to the suction channels 3A of the suction areas 3.

The suction conduit 4 extends to a hole or housing opening 9 that passes through the inner wall 12 of the engine housing, to be connected to a respective jet pump 7 that is arranged in the open flow cross-section 6 of the engine 5 for generating the required suction flow. The particular embodiments and arrangement of one or more jet pumps 7 will be described below. In general a suitable configuration, arrangement, number and location of the jet pumps 7 in the engine 5 is selected for generating the volume flow and degree of suction vacuum required for a given application, i.e. depending on the size, number and characteristics of the suction areas 3 provided on the aircraft. The particular locations of the jet pumps 7 are also selected to achieve the most convenient installation of the jet pumps 7 as well as the suction conduit 4.

For the sake of clarity and simplicity, FIG. 1 shows only a single suction conduit 4, with a branch conduit 4A connected thereto by a T-junction 4B. The branch conduit leads to another hole 9, where it can be connected to another jet pump 7 provided in the engine 5. It should be understood that the present system may actually include a network of several interconnected conduits 4 that are joined together or branched from one another by means of suitable pipe or hose connectors, T-branches, Y-branches and the like, as necessary for distributing the required suction vacuum to all of the suction areas 3 throughout the aircraft. All of the jet pumps 7 provided in an engine 5 can be connected together to a single plenum or trunk conduit 4, which in turn can then be branched off to serve the several suction areas 3, whereby a functional redundancy is achieved. Alternatively, a single jet pump 7 or any subset of jet pumps 7 can be connected to a vacuum conduit 4 that serves a single suction area 3, while other jet pumps 7 are connected via other suction conduits 4 to other suction areas 3. Various configurations and layouts of a network of suction conduits 4 in accordance with the invention can readily be selected depending on the particular aircraft application.

The construction of a jet pump 7 according to the invention is shown by two example embodiments in FIGS. 2 and 3. These figures show a jet pump 7 installed generally in the open flow cross-section 6 of the engine 5, whereby the particular location of the jet pump 7 can be in the air intake of the engine 5 upstream of the fan, in the bypass channel just downstream of the fan, in the bypass channel downstream of or at the location in which it is rejoined with the core hot gas channel, in the core hot gas channel upstream of the compressor assembly, and/or in the core hot gas channel downstream of the turbine assembly, as will be described in detail below regarding FIGS. 4 to 7. the general schematic view of FIG. 2, the jet pump 7 includes a suction pipe 10 terminating in a suction port that is connected to the suction conduit 4 and protrudes through the housing opening 9 through the inner housing wall 12, whereby the suction pipe 10 is secured and sealed relative to the housing wall 12. The suction pipe 10 adjoins an ejector pipe 101 at substantially a 90° angle (or more generally an angle in the range from 60° to 120° for example), whereby the ejector pipe 101 has a lengthwise extension substantially parallel to the axis 13 of the engine 5, and thereby also substantially parallel to the axial air flow through the open flow cross-section 6 of the engine 5. The downstream end of the ejector pipe 101 flares to an outlet mouth or bell 10A that has an enlarged diameter and that faces downstream relative to the air flow through the open flow cross-section 6 of the engine 5. The ejector pipe 101 may alternatively have a constant diameter or a tapering diameter.

The upstream end of the ejector pipe 101 has an inlet opening 14 that faces upstream into the air flow through the open flow cross-section 6 of the engine, and that communicates into a driving jet pipe 15 that extends coaxially inside the ejector pipe 101. The driving jet pipe 15 terminates in a flared outlet mouth or bell 15A still within the ejector pipe 101, i.e. short of the downstream end of the outlet mouth or bell 10A of the ejector pipe 101. The driving jet pipe 15 can be manufactured as one piece with the ejector pipe 101, or can be a separate pipe that is pressed in a form-fitting and friction-fitting manner, or welded for example, into the inlet opening 14 so as to be tightly secured and sealed relative to the ejector pipe 101. With the above described arrangement, a portion of the air flow being propelled through the open cross-section 6 of the engine 5, for example as driven by the engine fan, flows into the inlet opening 14 and through the driving jet pipe 15, to be emitted as a driving jet 8 from the outlet mouth 15A of the driving jet pipe 15 into the space inside the outlet mouth 10A of the ejector pipe 101. The kinetic energy of the driving jet 8 emitted from the driving jet pipe 15 through the outlet mouth 10A creates a suction effect around the driving jet pipe 15 in the ejector pipe 101. This in turn creates a suction effect in the suction pipe 10, such that a suction air flow 81 is sucked from the suction conduit 4 through the suction pipe 10 and then out through the outlet mouth 10A of the ejector pipe 101 together with the driving jet flow emitted from the driving jet pipe 15. This suction air flow 81 is ultimately sucked from the boundary layer air flow along the suction areas 3, through the suction channels 3A, and then through the suction conduit 4 to the jet pump 7. The co-mingled air flow emitted from the outlet mouth 10A from the ejector pipe 101, as driven by the kinetic energy of the driving jet 8, then flows through the respective flow passages of the engine, to be finally exhausted in the output thrust of the engine.

FIG. 3 shows a simplified alternative embodiment of a jet pump 7. Here, a separate driving jet pipe 15 is completely omitted, and the suction pipe 10 and the ejector pipe 101 can be formed as continuous integral portions of a single bent pipe member. Namely, the jet pump 7 in this embodiment comprises a bent pipe member, including a suction pipe portion 10 that is bent at substantially 90° relative to an ejector pipe portion 101 that terminates in an expanded outlet mouth or bell 10A, or terminates in a constant or reduced diameter outlet. In this embodiment, the engine air or gas flow surrounding the ejector pipe 101 forms the driving jet 8, whereby the kinetic energy of this driving jet 8 flowing past the outlet mouth 10A of the ejector pipe 101 creates a reduced pressure and thus a suction air flow 81 in the suction pipe 10.

Thus, while the embodiment of FIG. 2 uses an "inner driving jet" 8, the simpler embodiment according to FIG. 3 uses an "outer driving jet" 8. In the embodiment of FIG. 2, the design or configuration of the jet pump 7 must particularly make sure that the inlet opening 14 and the intake portion of the driving jet pipe 15 have a proper configuration so as to minimize shock losses and the like. For the second embodiment according to FIG. 3, it is particularly important to provide an exact proper aerodynamic form for the outside of the suction pipe 10 and ejector pipe 101 in order to minimize the generation of vortices, turbulence and the like in the air flow in the open flow cross-section 6 of the engine 5, which may be the bypass channel or the core hot gas channel as will be described next. It should be noted that when the jet pumps 7 are to be installed in the core hot gas channel of the engine, then FIGS. 2 and 3 still pertain simply by replacing the inner housing wall 12 by the core jacket or casing 122 that forms the boundary between the bypass channel and the core hot gas channel.

The locations at which the jet pumps 7 can be arranged in the bypass engine 5 according to the invention are schematically illustrated in FIG. 4. For simplicity, FIG. 4 merely shows each jet pump 7 as an L-shaped member, without showing the details of its construction, which may be according to FIG. 2 or FIG. 3 at each location. The construction of the bypass engine 5 is shown merely schematically, including only the principle components thereof necessary for an understanding of the present suction generator system for achieving boundary layer suction and shock boundary layer control according to the invention.

The bypass engine 5 generally includes a housing or nacelle including an outer wall 11 and an inner housing wall 12, enclosing an engine shaft 121 including a connected exhaust tailcone extending along the central axis 13 of the engine 5. An engine fan 17 is mounted or connected at a forward end of the engine shaft 121 and is enclosed by a forward air intake 16 of the housing wall 12. A core jacket or casing 122 is connected to and spaced between the engine shaft 121 and the housing wall 12 by means of spacers 24 that can be arranged in any manner known in the art. The shaft 121 can comprise any known shaft arrangement including necessary mountings, bearings, gearings etc.

With the above general arrangement of a bypass engine 5, the housing wall 12 and the core casing or jacket 122 enclose a bypass channel or secondary flow channel 18 annularly therebetween, and the core casing or jacket 122 and the engine shaft 121 form a core hot gas channel or primary flow channel 19 annularly therebetween. The bypass channel 18 and the core channel 19 together form the open flow cross-section 6 of the engine 5, and generally extend rotation symmetrically and coaxially along the central axis 13 of the engine 5.

The fan 17 draws a cold intake air flow through the engine intake 16 and blows this air flow downstream through the engine, whereby the total air flow is divided by the core casing 122 into a primary flow that flows through the core channel 19 and a secondary flow that flows through the bypass channel 18. Without describing the detailed physical processes that take place in the two channels, in general, the primary flow and secondary flow are again reunited at the downstream or tail end of the engine where they are then emitted out of the tail thrust nozzle of the engine 5. The air flow or gas flow in any portion of the engine 5 can be used or regarded as the driving jet air flow 8 that can be utilized for driving the jet pumps 7 according to the invention.

According to the invention, at least one jet pump 7, but preferably a plurality of jet pumps 7, are arranged at prescribed installation locations within the engine, so that they will be exposed to a driving jet 8 of the air or gas flowing with high kinetic energy through the open flow cross-section 6 of the engine 5. Particularly according to the invention, installation locations generally on section planes designated by VA—VA, VB—VB, VC—VC, VD—VD, and VE—VE as shown in FIG. 4 will now be described.

The section plane VA—VA as shown in FIG. 4 generally comprises the open flow cross-section 6 in the area of the engine air intake 16 forward or upstream of the fan 17. The section plane VB—VB generally comprises a flow cross-section downstream or aft of the fan 17, corresponding to the beginning of the bypass channel 18. Cross-section VC—VC generally corresponds to the downstream or outlet end of the bypass channel 18. Cross-section VD—VD generally corresponds to the upstream or inlet end of the core channel 19 downstream of the fan 17. The cross-section VE—VE generally corresponds to the downstream or outlet end of the core channel 19.

The cross-section planes VD—VD and VE—VE can especially further be understood in connection with the detail views of FIGS. 6 and 7, which show the arrangement of a compressor assembly 20, a diffuser chamber 21, a combustion chamber 22, a turbine assembly 23, and spacer members 24 sequentially one after another in the flow direction between the engine shaft 121 and the core casing 122. In this context, the cross-section plane VD—VD corresponds to the arrangement of one or more jet pumps 7 upstream or forward of the compressor assembly 20, while the section plane VE—VE corresponds to the arrangement of one or more jet pumps 7 downstream of the turbine assembly 23 and the spacer members 24.

At each of the locations represented by the illustrated section planes within the engine 5, a driving jet 8 of air (or combustion gases for locations downstream of the combustion chamber 22) flows through the respective air intake passage 16, bypass channel 18, or core channel 19, whereby this driving jet 8 has a high kinetic energy and can readily be utilized for driving one or more jet pumps 7 as discussed above. Basically, the jet pumps 7 can be arranged at any location in the engine in which a sufficient driving jet flow 8 would flow along the ejector pipe 101 of the respective jet pump 7. The locations illustrated and described herein are the preferred exemplary locations. It should further be understood that the specific installation locations are to be selected in each particular application, depending on ease of installation of the respective jet pump 7 and of the respective suction conduit 4 connected to the jet pump 7. The total number of jet pumps 7 and their size, configuration and arrangement are selected based on the suction flow volume and degree of suction vacuum required for a given application in view of the amount of boundary layer air that is to be sucked away, as well as the total surface area of the suction areas 3 provided on the outer skin 2 of the aircraft 1.

The cross-sectional views of FIGS. 5A, 5B, 5C, 5D, 5E and 5F show exemplary arrangements of one or more jet pumps 7 at each sectional plane described above. While these figures show possible exemplary arrangements, it should be understood that basically any number of jet pumps can be arranged at any circumferential location at any cross-sectional plane of the engine. FIGS. 5A, 5B and 5C each show the arrangement of one or more jet pumps 7 protruding radially inwardly from the inner housing wall 12 of the engine 5. While these sectional views particularly relate to the section planes VA—VA, VB—VB, and VC—VC in FIG. 4, respectively, it should be understood that the arrangement of one or more jet pumps 7 shown in each one of these figures could be used at any other one of the section planes as well. For example, the arrangement of jet pumps 7 shown in FIG. 5A could be used at section planes VB—VB or VC—VC as well as at section plane VA—VA. A similar interchangeability of the arrangement of jet pumps as shown in FIGS. 5D, 5E and 5F also pertains, whereby these figures relate to cross-sections through the core hot gas channel 19 along the section planes VD—VD and VE—VE.

According to FIG. 5A, four jet pumps 7 are arranged uniformly circumferentially spaced from one another, i.e. at substantially 90° relative to each other, along the inner surface of the inner housing wall 12 of the engine. According to FIG. 5B, only a single jet pump 7 is arranged at the vertically upper or top portion of the inner housing wall 12. FIG. 5C shows a variation with three jet pumps 7 arranged uniformly circumferentially distributed about the inner surface of the inner housing wall 12.

The number and arrangement of jet pumps according to FIGS. 5D, 5E and 5F in the core hot gas channel 19 protruding from the inner surface of the core casing 122 generally corresponds to the arrangements of jet pumps 7 in the bypass channel 18 according to FIGS. 5A, 5B and 5C respectively. Thus, FIG. 5D shows the arrangement of four mutually and uniformly circumferentially spaced jet pumps 7 protruding from the inner surface of the core casing 122 into the core channel 19, while FIG. 5E shows a single jet pump 7 arranged at the top of the core channel 19, and FIG. 5F shows three uniformly circumferentially spaced jet pumps 7 in the core channel 19.

The arrangement and installation of one or more jet pumps 7 in different portions of the open flow cross-section 6 of a bypass engine 5 achieves an economical generation of a suction air flow to achieve an efficient boundary layer suction and shock boundary layer control. The jet pumps 7 according to the invention make use of the substantial kinetic energy of the large air flow mass that is constantly driven through each engine 5 of the aircraft, especially during cruise flight. For example, a typical present-day bypass engine 5 will have a gas mass flow of about 150 kg/sec through the bypass channel and about 25 kg/sec through the core channel. On the other hand, a relatively low mass flow of air is required to provide the suction flow for sucking away boundary layer air from the suction areas 3 provided along the leading edge and top surface of the wings and/or the empennage of an aircraft. Namely, a suction air flow of about 1 kg/sec per engine is required in a typical case for achieving an adequate total boundary layer suction and control.

Thus, the suction air flow represents only a small percentage portion of the total air mass flow through the engine 5. Even considering a slight unavoidable flow loss and inefficiency resulting from the arrangement of jet pumps 7 within the open flow cross-section of the engine 5, the total losses or additional load and fuel requirements of the engines is very small as a percentage of the normal operating air flow, load, and fuel consumption of the engines. Moreover, any such slight disadvantage is far outweighed by the aerodynamic benefits achieved by providing an overall boundary layer control according to the present invention.

The invention thus makes it possible to economically and relatively efficiently use the available and pre-existing energy of the engines of the aircraft to achieve the required boundary layer control. The installation of the jet pumps 7 as well as the system of suction conduits 4 is relatively simple, and can even be retro-fitted in existing engine and aircraft configurations. This is especially true because only relatively short distances must be bridged by the suction conduits 4, e.g. between the suction channels 3A provided in the wings 11 and the jet pumps 7 arranged in the respective closest engine 5. Moreover, since the entire system according to the invention avoids the use of moving parts, the inventive system is substantially maintenance free and nearly completely secure against failure.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims. Throughout this specification, the term "substantially" refers to an allowance for normal unavoidable or acceptable tolerances and variations in this art, while still achieving the intended effect. The terms "upstream" and "downstream" are used relative to the axial direction of gas flow through the engine.

What is claimed is:

1. In an aircraft including an aircraft body having an outer skin with at least one suction area thereon, and an air-breathing engine that is connected to said aircraft body and that has an air flow passage therein, wherein said suction area is adapted to have air sucked therethrough;

an improved boundary layer suction system comprising at least one jet pump arranged in said air flow passage of said engine and adapted to generate a suction air flow responsive to a driving jet flow that is propelled through said air flow passage of said engine, and at least one suction conduit connecting said at least one jet pump with said at least one suction area.

2. The boundary layer suction system in the aircraft according to claim 1, wherein said aircraft body includes a fuselage, an empennage and wings extending from said fuselage, said at least one engine is connected to at least one of said wings and said empennage, said at least one suction area includes a first flow critical area along a leading edge of at least one of said wings and said empennage and a second flow critical area along a top low pressure area of at least one of said wings and said empennage, and said first and second flow critical areas are adapted to have at least a portion of boundary layer air forming a boundary layer therealong sucked away through said outer skin at said first and second flow critical areas so as to maintain said boundary layer in a laminar flow condition and achieve a shock boundary layer control.

3. The boundary layer suction system in the aircraft according to claim 1, wherein a respective jet pump among said at least one jet pump comprises a suction pipe that is connected to said suction conduit and that extends into said air flow passage of said engine.

4. The boundary layer suction system in the aircraft according to claim 3, wherein said respective jet pump further comprises an ejector pipe connected to said suction pipe in said air flow passage, and wherein said ejector pipe has an outlet opening facing in a downstream direction in said air flow passage relative to a flow direction of said driving jet flow.

5. The boundary layer suction system in the aircraft according to claim 4, wherein said air flow passage includes at least one of a bypass channel and a hot gas channel, and wherein a lengthwise axis of said ejector pipe is substantially parallel to a central axis of said engine and is parallel to at least one of said bypass channel and said hot gas channel.

6. The boundary layer suction system in the aircraft according to claim 4, wherein said engine is a bypass engine including an engine housing wall and a core casing arranged within said engine housing wall to divide a second portion of said air flow passage of said engine into a bypass channel annularly between said core casing and said engine housing wall and a core channel radially inside said core casing, wherein a first portion of said air flow passage upstream of said second portion comprises an air intake passage, and wherein said suction pipe extends through said engine housing wall and said ejector pipe is arranged in said bypass channel or in said intake passage.

7. The boundary layer suction system in the aircraft according to claim 4, wherein said engine is a bypass engine including an engine housing wall and a core casing arranged within said engine housing wall to divide a second portion of said air flow passage of said engine into a bypass channel annularly between said core casing and said engine housing wall and a core channel radially inside said core casing, wherein a first portion of said air flow passage upstream of said second portion comprises an air intake passage, and wherein said suction pipe extends through said core casing and said ejector pipe is arranged in said core channel.

8. The boundary layer suction system in the aircraft according to claim 4, wherein said ejector pipe and said suction pipe are integrally formed with each other as portions of a single bent pipe member.

9. The boundary layer suction system in the aircraft according to claim 8, wherein said respective jet pump essentially consists of said suction pipe and said ejector pipe integrally formed with one another as said portions of said single bent pipe member.

10. The boundary layer suction system in the aircraft according to claim 4, wherein said suction pipe is connected to said ejector pipe at an angle of substantially 90°.

11. The boundary layer suction system in the aircraft according to claim 4, wherein said outlet opening comprises an outwardly flaring outlet bell.

12. The boundary layer suction system in the aircraft according to claim 4, wherein said respective jet pump further comprises a driving jet pipe that extends within said ejector pipe and that has a jet pipe outlet which opens into an interior space within said ejector pipe and a jet pipe inlet which opens facing in an upstream direction opposite said downstream direction.

13. The boundary layer suction system in the aircraft according to claim 12, wherein said driving jet pipe comprises a straight pipe member that extends coaxially within said ejector pipe parallel to said flow direction of said driving jet flow, wherein said jet pipe inlet is formed by an upstream opening at an upstream end of said ejector pipe opposite said outlet opening, and wherein said driving jet pipe is secured and sealed to said ejector pipe around said upstream opening.

14. The boundary layer suction system in the aircraft according to claim 12, wherein said jet pipe outlet is formed by an outwardly flaring outlet bell at a free end of said driving jet pipe.

15. boundary layer suction system in the aircraft according to claim 1, wherein said at least one jet pump comprises a plurality of jet pumps arranged on a single cross-sectional plane in said engine.

16. The boundary layer suction system in the aircraft according to claim 1, wherein said at least one jet pump comprises a plurality of jet pumps arranged on respective different cross-sectional planes in said engine.

17. The boundary layer suction system in the aircraft according to claim 1, wherein said at least one jet pump comprises a plurality of jet pumps respectively arranged at different locations in said engine, and wherein said at least one suction conduit comprises a plurality of branch suction conduits respectively connected to said jet pumps, and further comprising at least one conduit junction joining together said branch suction conduits.

18. The boundary layer suction system in the aircraft according to claim 1, wherein said engine is a bypass engine including a fan, a compressor assembly and a turbine assembly respectively connected to a shaft arrangement, wherein said air flow passage includes an air intake passage upstream of said fan, a bypass channel downstream of said fan, and a core channel downstream of said fan with said compressor assembly and said turbine assembly arranged therein, and wherein said at least one jet pump is arranged in said intake passage upstream of said fan.

19. The boundary layer suction system in the aircraft according to claim 1, wherein said engine is a bypass engine including a fan, a compressor assembly and a turbine assembly respectively connected to a shaft arrangement, wherein said air flow passage includes an air intake passage upstream of said fan, a bypass channel downstream of said fan, and a core channel downstream of said fan with said compressor assembly and said turbine assembly arranged therein, and wherein said at least one jet pump is arranged in said bypass channel.

20. The boundary layer suction system in the aircraft according to claim 1, wherein said engine is a bypass engine including a fan, a compressor assembly and a turbine assembly respectively connected to a shaft arrangement, wherein said air flow passage includes an air intake passage upstream of said fan, a bypass channel downstream of said fan, and a core channel downstream of said fan with said compressor assembly and said turbine assembly arranged therein, and wherein said at least one jet pump is arranged in said core channel upstream of said compressor assembly.

21. The boundary layer suction system in the aircraft according to claim 1, wherein said engine is a bypass engine including a fan, a compressor assembly and a turbine assembly respectively connected to a shaft arrangement, wherein said air flow passage includes an air intake passage upstream of said fan, a bypass channel downstream of said fan, and a core channel downstream of said fan with said compressor assembly and said turbine assembly arranged therein, and wherein said at least one jet pump is arranged in said core channel downstream of said turbine assembly.

\* \* \* \* \*